(12) United States Patent
Sforzin et al.

(10) Patent No.: US 11,775,387 B2
(45) Date of Patent: Oct. 3, 2023

(54) CYCLIC REDUNDANCY CHECK (CRC) RETRY FOR MEMORY SYSTEMS IN COMPUTE EXPRESS LINK (CXL) DEVICES

(71) Applicant: Micron Technology, Inc., Boise, ID (US)

(72) Inventors: Marco Sforzin, Milan (IT); Paolo Amato, Treviglio (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/883,399

(22) Filed: Aug. 8, 2022

(65) Prior Publication Data

US 2023/0259424 A1    Aug. 17, 2023

Related U.S. Application Data

(60) Provisional application No. 63/301,988, filed on Jan. 21, 2022.

(51) Int. Cl.
*G06F 11/10* (2006.01)

(52) U.S. Cl.
CPC ...... *G06F 11/1068* (2013.01); *G06F 11/1004* (2013.01); *G06F 11/1076* (2013.01)

(58) Field of Classification Search
None
See application file for complete search history.

(56) References Cited

U.S. PATENT DOCUMENTS

| | | | | |
|---|---|---|---|---|
| 8,745,464 B2* | 6/2014 | Subashchandrabose | | G11C 29/00 714/767 |
| 11,188,417 B2* | 11/2021 | Chung | | G06F 11/102 |
| 2010/0211834 A1* | 8/2010 | Asnaashari | | G06F 11/1004 714/763 |
| 2015/0135042 A1* | 5/2015 | Im | | G06F 11/1004 714/807 |
| 2015/0178155 A1* | 6/2015 | Kim | | G06F 11/1012 714/758 |
| 2017/0300246 A1* | 10/2017 | Michaeli | | G06F 3/0688 |
| 2018/0219562 A1* | 8/2018 | Lee | | H03M 13/098 |
| 2019/0095275 A1* | 3/2019 | Dusija | | G06F 3/0679 |
| 2019/0158223 A1* | 5/2019 | Carlough | | H04L 1/0045 |
| 2020/0201785 A1* | 6/2020 | Hanna | | G11C 16/14 |
| 2020/0218608 A1* | 7/2020 | Zhu | | G11C 11/4096 |
| 2021/0049062 A1* | 2/2021 | Balakrishnan | | G06F 11/1016 |

OTHER PUBLICATIONS

Kulakowski et al., "Using CRC to Increase Data Integrity" Mar. 1, 1994, IBM TDB Archive (Year: 1994).*

* cited by examiner

*Primary Examiner* — Daniel F. McMahon
(74) *Attorney, Agent, or Firm* — Wood IP LLC

(57) ABSTRACT

Provided is a computing system including a memory system in communication with a host, and for storing data therein and the memory system includes a memory having a plurality of memory components and a memory array and coupled to the controller via a memory interface. Each memory component includes a memory cyclic-redundancy-check (CRC) engine that performs a CRC check of data during read and write operations between the host and the memory array. The memory system also includes a controller that has a plurality of controller CRC engines and communicates with the memory components to control data transmission between the memory, the host and the memory array.

20 Claims, 8 Drawing Sheets

CYCLIC REDUNDANCY CHECK (CRC) RETRY FOR MEMORY SYSTEMS IN COMPUTE EXPRESS LINK (CXL) DEVICES

CROSS REFERENCE TO RELATED APPLICATIONS

This application claims benefit to U.S. Provisional Patent Application No. 63/301,988, file 21 Jan. 2022, and entitled "CRC retry in LP5 components of CXL devices with CRC-RAID RAS," the disclosure of which is incorporated herein in its entirety by reference.

TECHNICAL FIELD

The present disclosure relates generally to memory system and methods, and more particularly to cyclic redundancy check (CRC) retry methods for protecting against errors in the link between the controller and the memory of a memory system during read and write operations of data within a CRC-RAID (Redundant Array of Independent Disks) environment.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states.

For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

It is desirable to have a memory system and methods that enable retry operations within the ASIC environment during both the read and write operations which improves memory speed and accuracy resulting in higher reliability of CXL devices.

Figure 1:
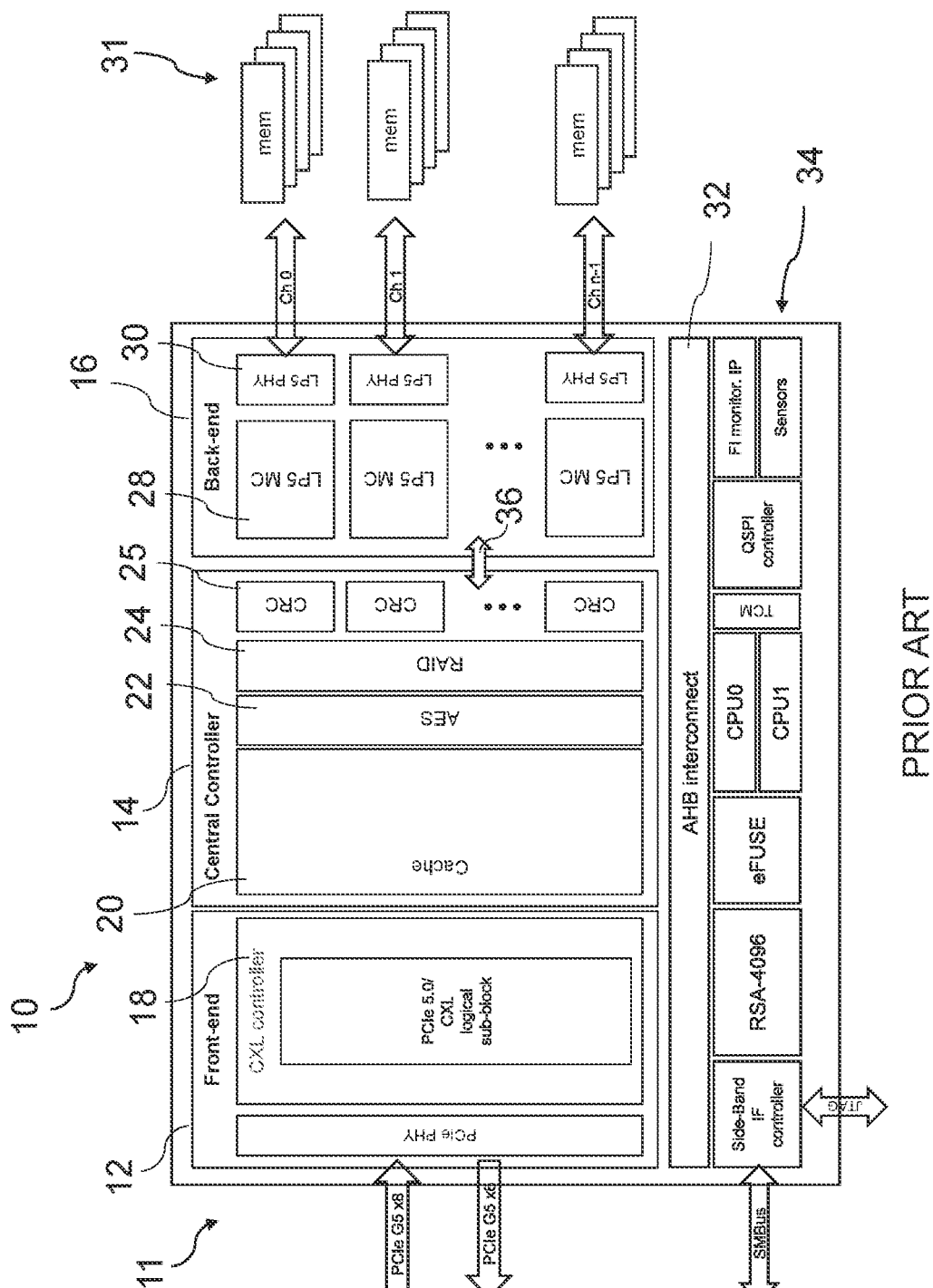
FIG. 1 is a block diagram illustrating a typical application-specific integrated circuit (ASIC) architecture for a CRC-RAID.

The drawings are only for purposes of illustrating preferred embodiments and are not to be construed as limiting the disclosure. Given the following enabling description of the drawings, the novel aspects of the presently described technology should become evident to a person of ordinary skill in the art. This detailed description uses numerical and letter designations to refer to features in the drawings. Like or similar designations in the drawings and description have been used to refer to like or similar parts of embodiments of the presently described technology.

DETAILED DESCRIPTION OF THE EMBODIMENTS

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating an application-specific integrated circuit (ASIC) architecture 10 for a CRC-RAID. A typical ASIC architecture 10 for a CRC-RAID includes a memory system 11 having a front end 12, a central controller 14 and a back end 16. The front-end 12 consists of a CXL controller 18 and physical layer 19 and interfaces with a host (not shown). The central controller 20 includes a cache 20 to temporarily store data, AES 22, a RAID 24, and a plurality of CRC engines 25.

The back-end 16 includes multiple memory components 28 and physical layers 30 thereof and memory arrays 31. The memory components 28 are organized in channels and ranks. The architecture 10 also includes an interconnect or bus 32 connecting to several other components 34 as shown. Traditionally, read and write operations of data or media are performed via the central controller 14.

In the read direction, data is retrieved from memory arrays 31 and sent to the host; and in the write direction, data is transmitted from the host and sent to the memory components 28 for the memory arrays 31 via a memory interface or link 36. In this type of integrated circuit architecture, link protection against errors is typically performed using a link ECC in the memory components 28. Instead, of using link ECC, in the present disclosure, a dynamic link exchange protocol (DLEP) is used in a LP5 component in order to transmit information.

Figure 2:
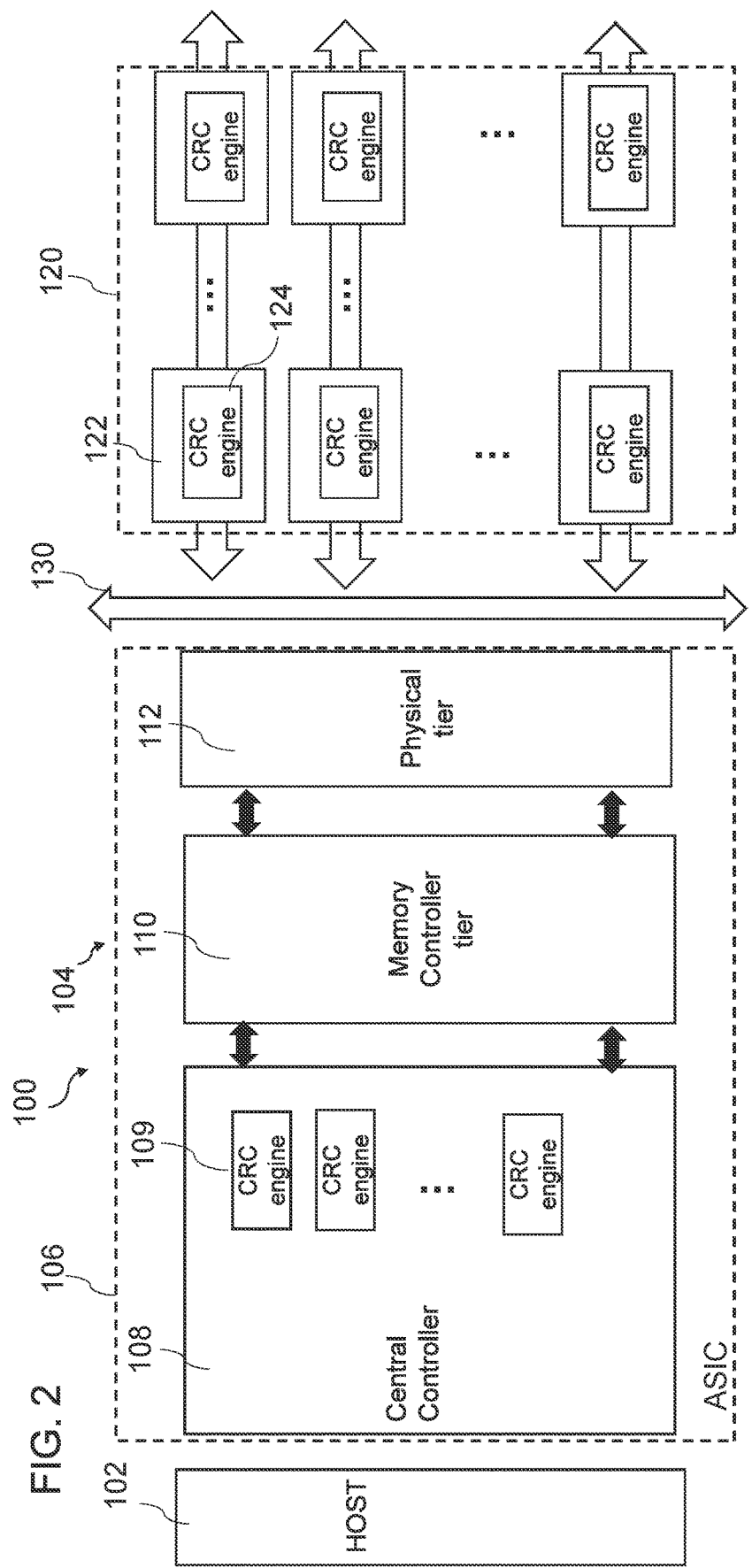
FIG. 2 is a block diagram of a computing system according to one or more exemplary embodiments of the present disclosure.

FIG. 2 is a computing system 100 including a host 102 in communication with a memory system 104, in accordance with the embodiments. The host 102 can be a host system including for example, a personal laptop computer, a desktop computer, a mobile device (e.g., a cellular phone), a network servicer, a memory card reader, a camera or any other suitable type of host system or device.

According to the embodiments, the memory system 104 is an ASIC-type. The memory system 104 includes a controller 106 comprising a central controller 108 including a pool of CRC engines 109, a memory controller 110 and a physical tier 112. Alternatively, according to other embodiments of the present disclosure, the CRC engines 109 may be disposed within the memory controller 110.

The controller 106, and its components, may be implemented in hardware, firmware and software, or any combinations thereof The controller 106 is coupled to the host 102 via a host interface 103 which is used to transfer data between the memory system 104 and the host 102. The host interface 103 is a standard interface for example, such as a serial technology attachment (SATA), peripheral component interconnect express (PCLe) or a universal series bus (USB) or other type of connector or interface. The host 102 and the memory system 104 each include a compatible receptor for transmitting data and other signals via the host interface 103.

The memory system 104 further comprises a memory 120 including plurality of memory components 122 coupled to the controller 106 via memory interface 130 (e.g., a link/bus). The controller 106 and the memory 120 also each include a compatible receptor with the memory interface 130 for transmitting data and other signals to and from each other. The memory 120 is configured to write and read data to/from memory array 140.

The memory components 122 can include dies, chips, etc., providing storage volume for the memory system 104. According to one or more embodiments of the present invention, the memory components 122 and be low power (LP5) or double data rate (DDR) type memory components. The memory interface 130 therefore may be an associated link based on the type of memory component 122, for example a DDR or LP5 link, DRAM, HRAM or any other type of memory component and interface suitable for the purpose set forth herein.

The memory components 122 each comprise a CRC engine 124 similar to that of the central controller 108 and the data or media therein is organized in channels and ranks. Additional details regarding the communications between the host 102 and the controller 106 and memory 120 of the memory system 104 will be discussed below with reference to FIGS. 3 through 6.

Figure 3:
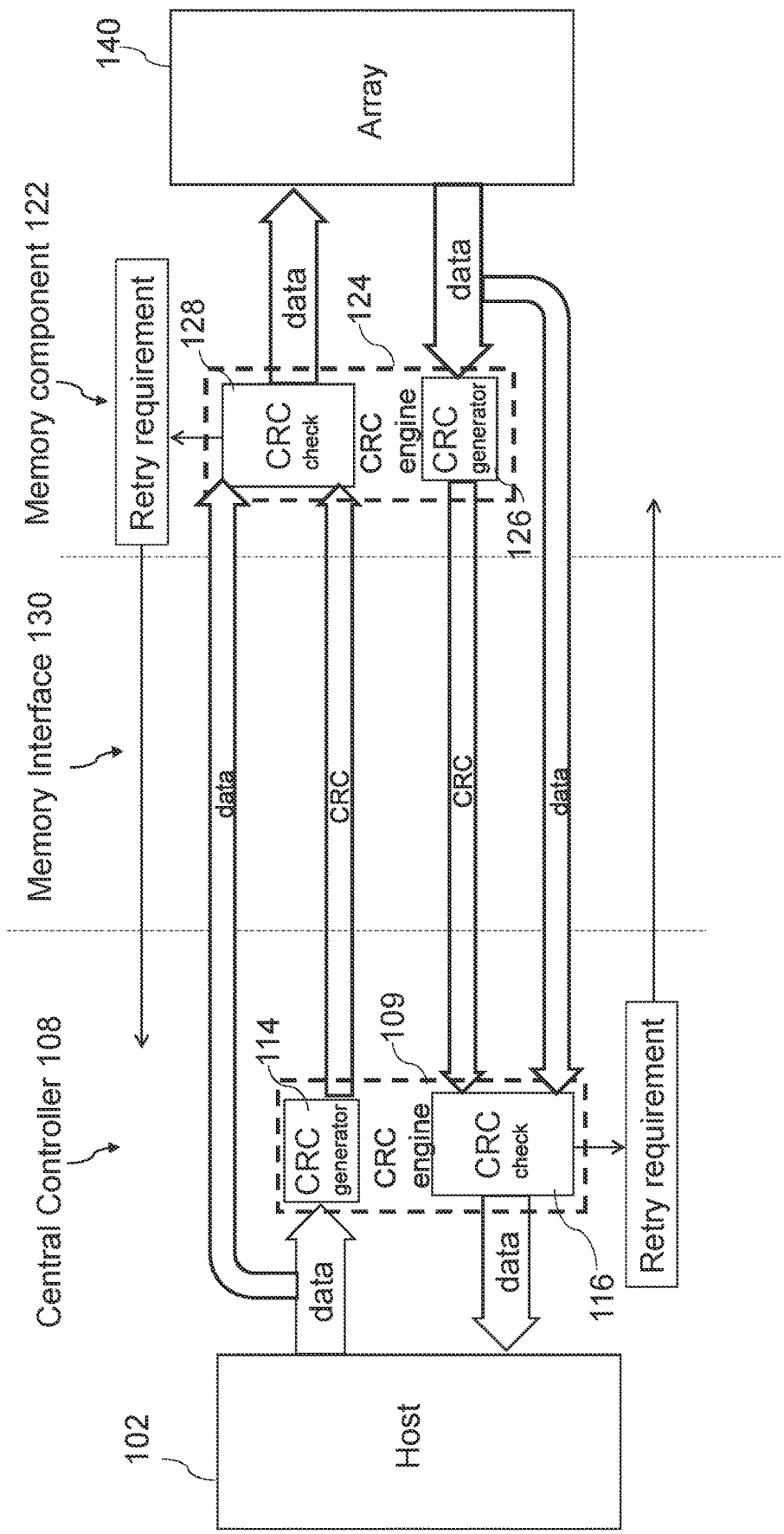
FIG. 3 is flow diagram illustrating example methods including CRC retry operations of the computing system of FIG. 2 according to one or more exemplary embodiments of the present disclosure.

FIG. 3 is flow diagram illustrating data transmission methods performed within the computing system of FIG. 2, between the host and the memory system and therein according to one or more exemplary embodiments of the present disclosure. As shown in FIG. 3, the controller 106 is configured to communicate with the memory components 122 of the memory 120 to control data transmission (e.g., data read, write, erase and other operations) between the memory 120 and the host 102 and the memory array 140.

As mentioned above, the central controller 108 of the controller 106 includes CRC engines 109 and each memory component 122 includes a CRC engine 124. These CRC engines 109 and 124 are configured to perform retry operations when errors are detected at the memory interface 130 (e.g., the LP5 link). The CRC engine 109 includes a CRC generator 114 and a CRC check component 116.

Similarly, the CRC engine 124 of the memory component 122 includes a CRC check component 128 and a CRC generator 126.

In the read direction, once a command is sent to the memory component 122 from the host 102 via the central controller 108, the data is retrieved from the array 140 and sent to the CRC generator 126 and to the CRC check component 116. The CRC check component 116 acts as a receiver and re-computes the CRC parity as the CRC generator 114 does starting from the bits of data it receives and then compares the resulting CRC parity with the CRC parity received from the CRC generator 126 which acts as a transmitter in this embodiment. According to an embodiment, the CRC parity is a vector of bits computed starting from the bits of the data packet to be protected. Once the CRC check component 116 completes the comparison process, and the data is sent to the host 102 if the CRC check indicates a match.

Figure 6:
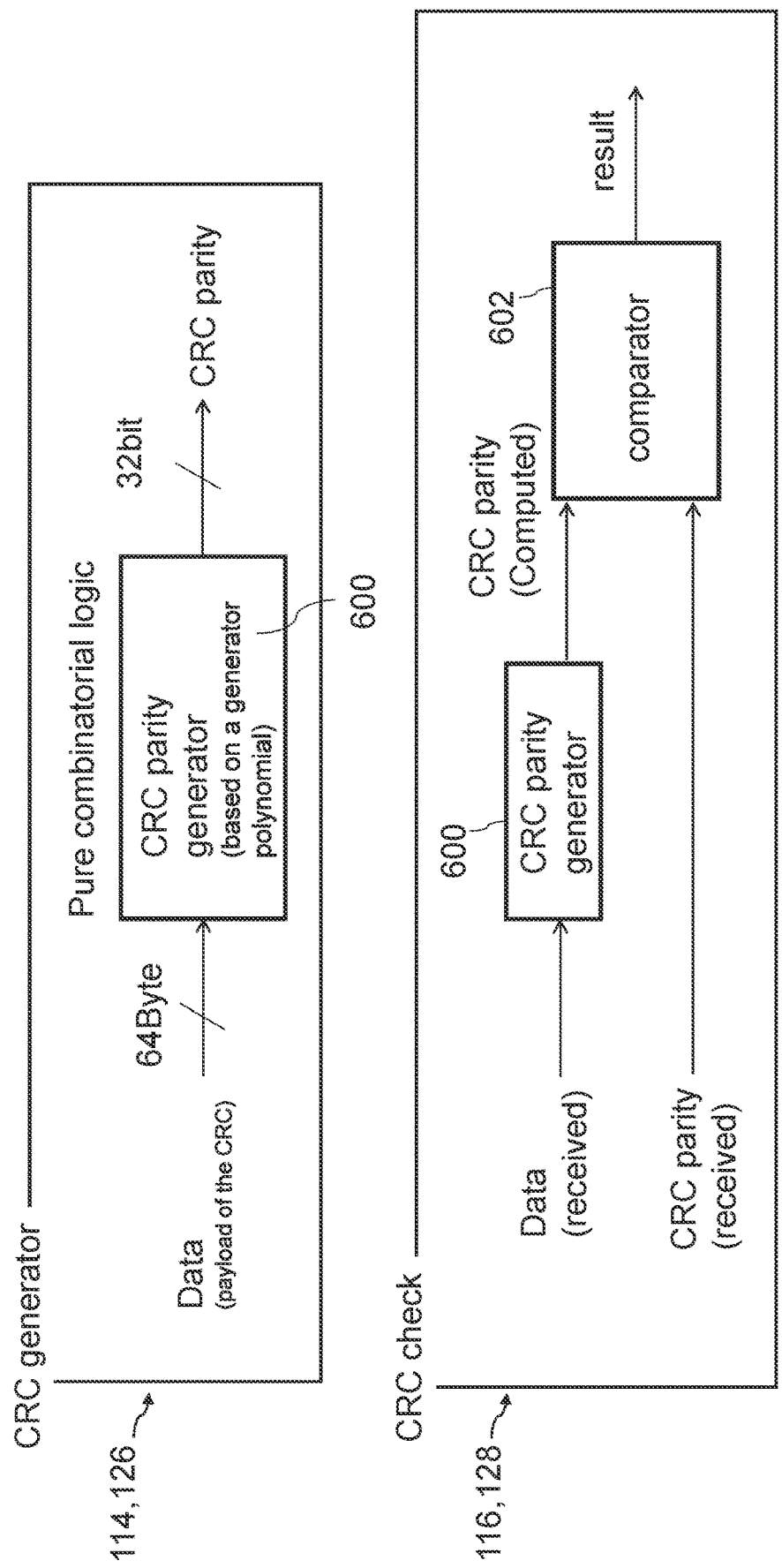
FIG. 6 is a detailed block diagram illustrating the CRC check performed within the CRC engines of the controller and each of the memory components as shown in FIG. 3 according to one or more exemplary embodiments of the present disclosure.

According to an embodiment, the CRC generator 114 and the CRC generator 124 are CRC encoders and the CRC check 116 and the CRC check 128 of the memory component are CRC decoders. A CRC decoder being a CRC encoder including a comparator for the CRC parities as shown in FIG. 6.

In another embodiment, in the write direction, the data is sent to the CRC generator 114 which acts as a transmitter and to the CRC check component 128 which acts as a receiver and resultant data (CRC parity) from the CRC generator 114 is then compared to the CRC parity recomputed at the CRC check component 128 and if it indicates a match then the data is sent to the memory array 140. If instead there is a mismatch, then a retry requirement is sent back to the central controller 108. The central controller 108 retransmits the data a second time to overcome the (random) link noise. More details regarding the read and write methods and the operations of the CRC engines 109 and 124 are discussed below with reference to FIGS. 4-6.

Figure 4:
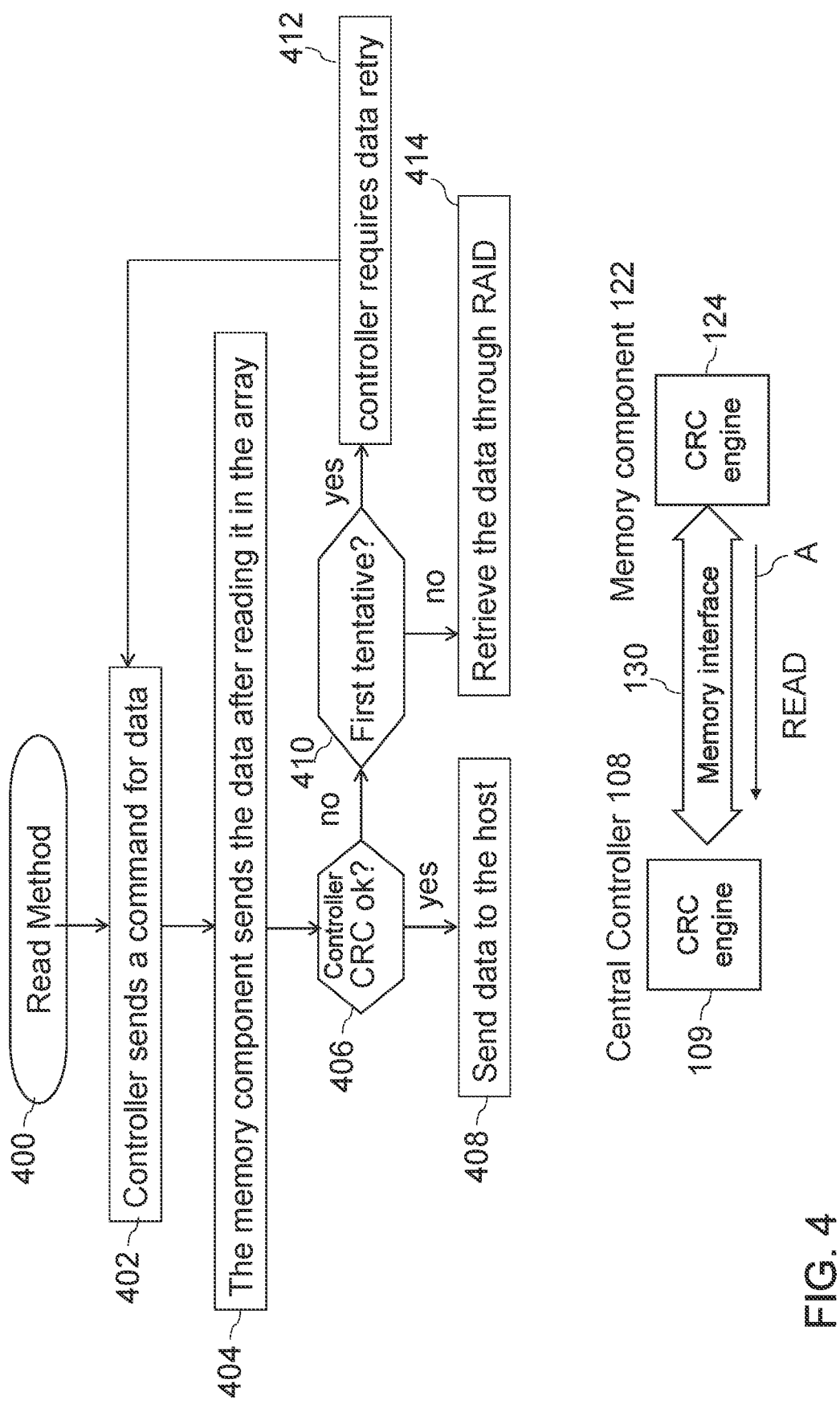
FIG. 4 is a flow chart illustrating an example read method of FIG. 3 including a CRC retry operation in the read direction according to one or more exemplary embodiments of the present disclosure.

FIG. 4 is a flow chart illustrating an example read method 400 of FIG. 3 including a CRC retry operation in the read direction (arrow 'A') from the memory component 122 to the central controller 108 via the memory interface 130 (e.g., LP5 link). The method 400 will be described below with reference to FIG. 3 and begins at operation 402, where the controller 106 sends a command for data or media to the memory 120.

At operation 404, the memory component 122 sends the data after reading it from the array 140. At operation 406, the controller 108 performs a CRC check via the CRC engine 109 to detect whether there is an error at the memory interface 130. A CRC code is used to detect an error and determining its position in a stripe of data within the RAID. The host 102 views the memory array 140 as an array having a plurality of locations. Each location is labeled as an address and the CRC RAID mechanism defines a partition of the locations into stripes.

All the locations in the stripe are linked together by a zero-sum relation and the zero-sum condition is obtained by the RAID parity. The amount of data required by the host 102 is a user data block (UDB) for example, 64 bytes of data and each UDB is a strip within a stripe. The UDBs of the same RAID stripe are stored in different components and channels. If no error is found in the memory interface 130, then the method continues to operation 408 where the data is sent to the host 102. If the controller 108 performs the CRC check via the CRC engine 109 and an error(s) is detected on the memory interface 130, then it is determined whether this is a first occurrence or tentative, at operation 410. If it is the first time that the CRC fails, it is possible that the cause of the failure is link noise. In this case, a retry of the transmission (i.e., a second transmission) is performed. If the second transmission is correct, then the data can be transmitted towards the host 102.

If an error is detected, the controller 108 performs a CRC retry operation, via the CRC engine 109 at operation 412 towards the memory component 122. The CRC retry operation counteracts the error(s) on the memory interface in the read direction and operation 402 is repeated. If the CRC engine 109 detects an error and it's not a first tentative then a RAID recovery operation is activated to retrieve the data at operation 414.

Figure 7:
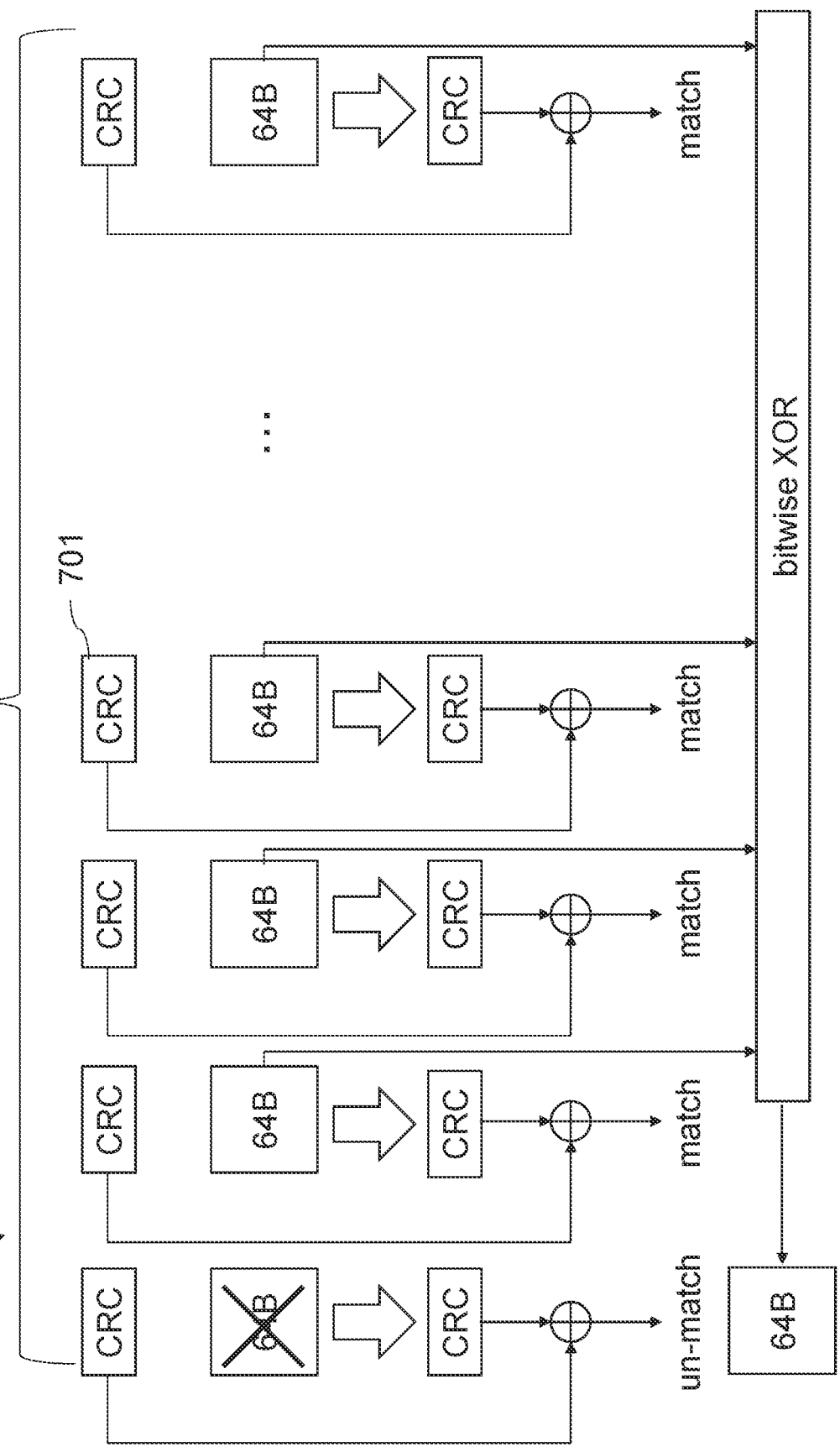
FIG. 7 is a chart illustrating a RAID method for retrieving data to be read from the memory in the memory system as discussed in FIG. 4, according to one or more exemplary embodiments of the present disclosure.

Referring ahead to chart 700 in FIG. 7, in a RAID method, all the remaining strips 701 of the stripe 710 to which the required UDB belongs are read and a lost pattern is retrieved by adding (XORing) the complementary strips 701 in the stripe 710. If they are a match, the data is retrieved (as depicted in chart 700 shown in FIG. 7). The complementary strips of the stripe are XORed together bitwise to obtain the pattern for replacing the corrupted pattern provided by the accessed UDB if all the complementary strips are correct. The correctness is checked through CRC. If an uncorrectable error occurs such as there being more than one UDB in a stripe that is incorrect, then the poison bit is set to thereby inform the host 102 (as depicted in FIG. 3) that there is an uncorrectable error in the data being returned to the host 102.

Figure 5:
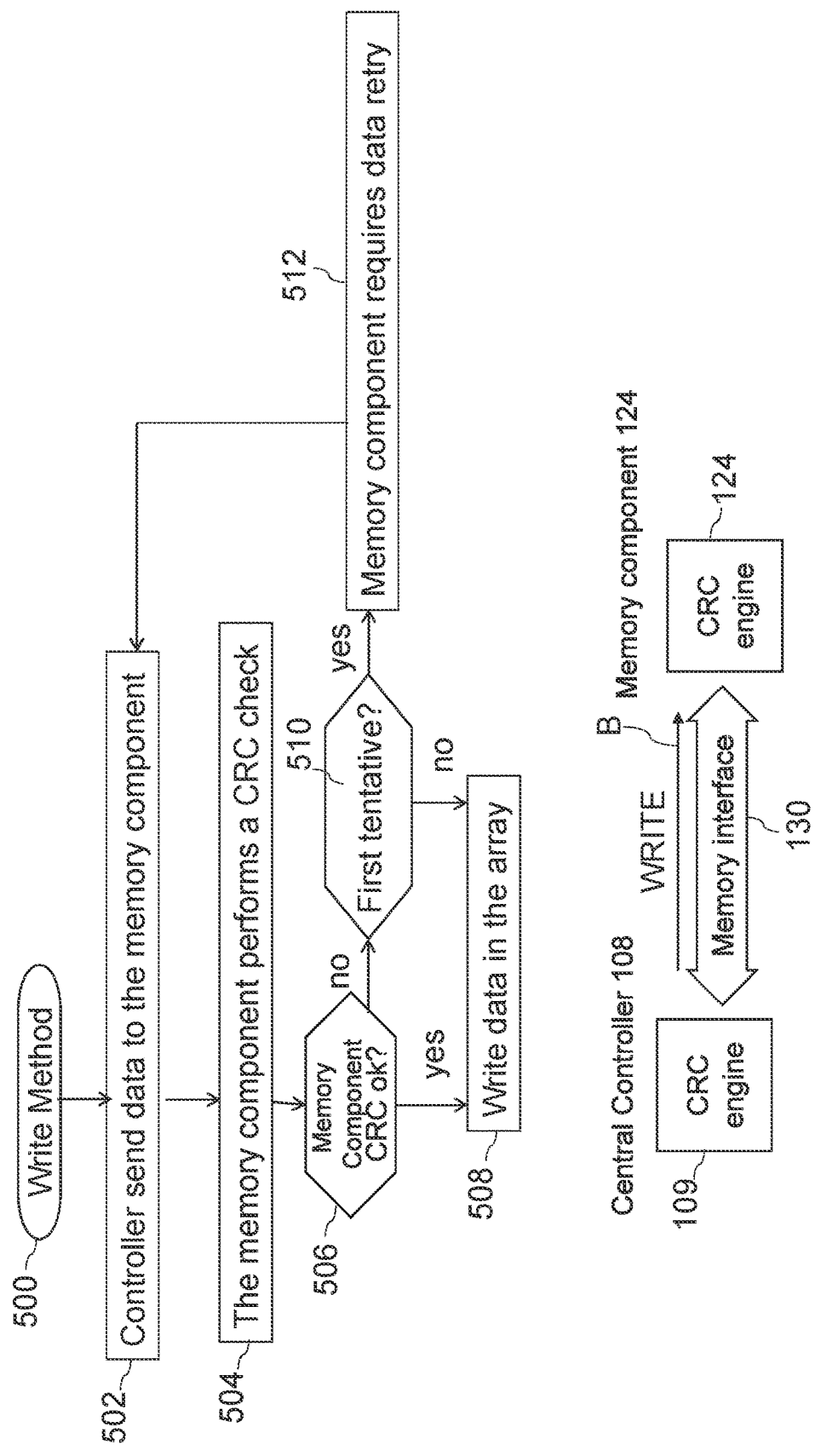
FIG. 5 is a flow chart illustrating an example write method of FIG. 3 including a CRC retry operation in the write direction according to one or more exemplary embodiments of the present disclosure.

FIG. 5 is a flow chart illustrating an example write method 500 of FIG. 3 including a CRC retry operation in a write direction (indicated by arrow 'B'). As shown in FIG. 5, the method 500 starts at operation 502 where the controller 108 sends data to the memory component 122. At operation 504, the memory component 122 performs a CRC check via the CRC engine 124 to detect whether there are any errors on the memory interface 130. If no errors are found, then the write operation is performed in the array 140 at operation 508.

Figure 8:
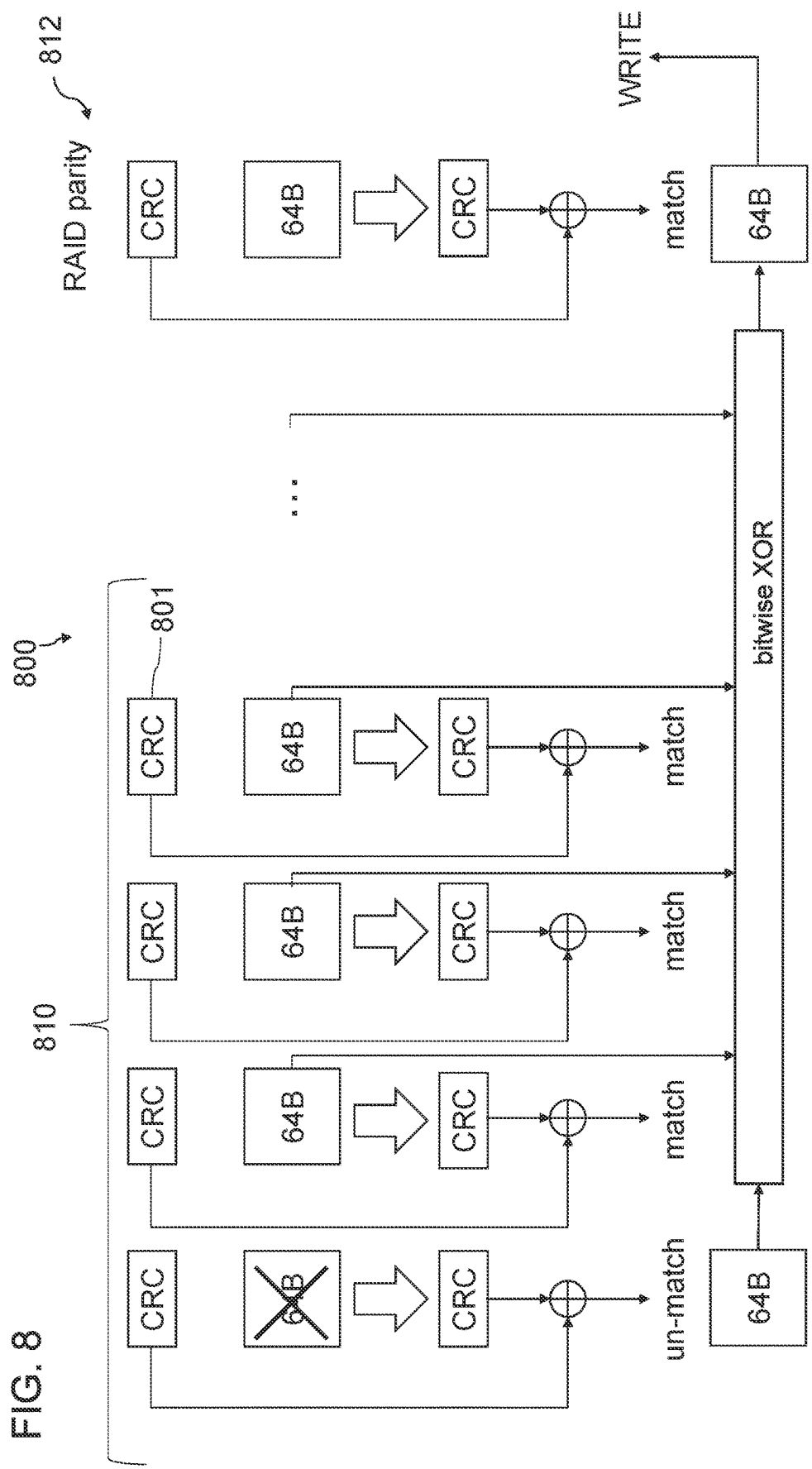
FIG. 8 is a chart illustrating a RAID method for writing data to the memory in the memory system as discussed in FIG. 5, according to one or more exemplary embodiments of the present disclosure.

If an error(s) is detected during the CRC check via the CRC engine 124, it is then determined if it is the first instance or tentative at operation 510. If so, then a CRC retry operation is performed via the CRC engine 124 of the memory component 122 towards the controller 109 to counteract the error(s) found in the memory interface 130 in the write direction and operation 502 is repeated. If it is determined at operation 510 that this is not the first tentative, then the write operation is performed in the array 140 at operation 508 via a RAID method (as depicted in the chart 800 shown in FIG. 8).

As depicted, when performing a write operation, the UDB needs to update the RAID parity of the stripe to which the UDB belongs. When an error is detected, the remaining strips 801 of the RAID stripe 810 is read and if there are matches then the data can be written to the appropriate location within the memory array 140. When writing a UDB the remaining strips 801 are read and compared with a new UDB pattern provided by the host 102, and the RAID parity 812 is then updated by adding to the stored RAID parity 812 pattern the results of the comparison. If there is an error when reading the UDB stored in the media subsystem, then the RAID parity 812 is updated by first reading all of the complementary strips 801 of the stripe 810.

FIG. 6 is a detailed block diagram illustrating more detail regarding the CRC check performed within the CRC engines 109 and 124 of the controller 108 and each of the memory components 122 as shown in FIG. 3 according to one or more exemplary embodiments of the present disclosure.

As shown in FIG. 6, the CRC generator 114, 126 of the CRC engines 109 and 124 of the controller 108 and each memory component 122 each includes a CRC parity generator 600. The CRC parity generator 600 receives data based on the payload of the CRC and performs a combinatorial logic operation based on a generator polynomial, for example, 64 bit to 32 bit to obtain the CRC parity. The CRC check component 116, 128 transmits the received data to the CRC parity generator 600 to compute the CRC parity and then compares the computed CRC parity to the CRC parity received via a comparator 600 to determine whether there is a data match. If there is a data match, then it is determined that no error has occurred. According to embodiments of the present invention, the CRC parity received is the CRC parity generated by the CRC generator 114 and 126. The CRC parity works like a signature. The CRC generator 114 and 126 computes the signature correspondent to the data to transmit. Then, transmits both the data and the signature (i.e., the CRC parity). The CRC check components 116 and 128, starting from the data received, computes the signature again (i.e., re-computes the CRC parity) and if the signature received is identical to the signature re-computed by the CRC check components 116 or 128 starting from the data, then it is determined that the transmission is correct.

A number of embodiments of the present disclosure provide benefits such as improving memory speed and accuracy within CXL devices during read and write operations. The embodiments of the present disclosure avoid the RAID triggering when a link error occurs. Therefore, the method of the present disclosure also improves latency and bandwidth by enabling a retry operation after a CRC fail to correct link errors and allows data to be corrected immediately without invoking RAID.

Although specific embodiments have been illustrated and described herein, those of ordinary skill in the art will appreciate that an arrangement calculated to achieve the same results can be substituted for the specific embodiments shown. This disclosure is intended to cover adaptions or variations of a number of embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of a number of embodiments of the present disclosure includes other applications in which the above structures and methods are used. Therefore, the scope of a number of embodiments of the present disclosure should determine with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A computing system comprising:
 a memory system in communication with a host, and configured to store data therein, the memory system comprising:
 a memory including a plurality of memory components and a memory array and coupled to the controller via a memory interface;
 wherein each of the memory components includes a memory cyclic-redundancy-check (CRC) engine con- figured to perform a CRC check of data during read and write operations between the host and the memory array; and a controller including one or more controller CRC engines and configured to communicate with the memory components to control data transmission between the memory, the host, and the memory array.

2. The computing system of claim 1, wherein the memory CRC engines and the controller CRC engines are configured to perform retry operations when errors are detected via the memory interface.

3. The computing system of claim 2, wherein each memory CRC engine and controller CRC engine comprises a CRC generator and a CRC check component;

wherein the CRC generator includes a CRC parity generator for receiving data and performing a combinatorial logic operation to obtain a CRC parity; and wherein the CRC check component is configured to transmit the received data to the CRC parity generator and compare, via a comparator, a computed CRC parity, of the CRC parity generator, to the CRC parity to determine whether there is a data match.

4. The computing system of claim 3, wherein during a read operation, the controller is configured to send a command for data to the memory from the host.

5. The computing system of claim 4, wherein the memory component is configured to retrieve the data from the memory array and send the retrieved data to the CRC generator to produce the CRC parity;

wherein the generated CRC parity is compared to the CRC parity of the data; and wherein data is sent to the host when there is a data match.

6. The computing system of claim 3, wherein during a write operation, the controller is configured to send data to the memory component to be written;

wherein the memory component is configured to perform a CRC check on the data received via the CRC check component of the memory CRC engine to detect errors on the memory interface;

wherein the data is sent to the controller CRC generator to (i) generate a CRC parity and (ii) compare the generated CRC parity to a CRC parity received at the CRC Check component of the memory CRC engine; and wherein data is sent to the memory array when there is a data match.

7. The computing system of claim 6, wherein when an error is detected during a CRC check of the write operation, the memory component is configured to perform a CRC retry operation via the memory CRC engine, the CRC retry operation counteracting the error when the error is a first tentative.

8. The computing system of claim 7, wherein when the detected error is not a first tentative, the data is retrieved via a RAID recovery operation.

9. A method comprising:

disposing memory CRC engines in a memory and controller CRC engines in a controller controlling data transmission between the memory and a host in communication therewith;

wherein each memory component of the memory comprises a memory CRC engine of the plurality of CRC engines; and performing, via a memory CRC engine and a controller CRC engine, a CRC check of data during read and write operations between the host and a memory array of the memory.

10. The method of claim 9, wherein a read operation comprises:

sending, via the controller, a command for data to the memory from the host, and retrieving, via the memory component, the data from the memory array; and sending the data to (i) a CRC generator of the memory CRC engine for generating a CRC parity and (ii) a CRC check component of the controller CRC engine; and comparing the generated CRC parity to a CRC parity of the data; and sending the data to the host when a data match occurs.

11. The method of claim 10, wherein when an error is detected at the memory interface during a CRC check of the read operation, performing, at the controller, a CRC retry operation via the controller CRC engine to counteract the error when it is a first tentative, and wherein when it is determined that it is not a first tentative, then retrieving the data via a redundant array of independent disk (RAID) recovery operation.

12. The method of claim 10, wherein a write operation comprises:

sending, via a command of the controller, data to the memory component to be written, and performing via the memory component a CRC check on the data received via the CRC check component of the memory CRC engine to detect whether there are any errors on the memory interface; and sending the data to the controller CRC generator to generate a CRC parity and to the CRC check component of the memory CRC engine for comparing the generated CRC parity to a CRC parity received;

wherein the data is sent to the memory array when a data match occurs.

13. The method of claim 12, wherein when an error is detected at the memory interface during a CRC check of the write operation, performing at the memory component, a CRC retry operation via the memory CRC engine to counteract the error when the error is a first tentative.

14. The method of claim 13, wherein when the error is not a first tentative, retrieving the data via a RAID recovery operation.

15. A memory system comprising:

a memory including one or more memory components and a memory array;

wherein each of the memory components includes a memory cyclic-redundancy-check (CRC) engine configured to perform a CRC check of data during read and write operations between a host and the memory array; and a controller (i) including one or more controller CRC engines and (ii) configured to communicate with the memory components to control data transmission between the memory, the host, and the memory array.

16. The memory system of claim 15, wherein the memory CRC engines and the controller CRC engines are configured to perform retry operations when errors are detected via the memory interface.

17. The memory system of claim 16, wherein each memory CRC engine and controller CRC engine comprises a CRC generator and a CRC check component, wherein the CRC generator includes a CRC parity generator for receiving data and performing a combinatorial logic operation to obtain a CRC parity; and wherein the CRC check component is configured to (i) transmit the received data to the CRC parity generator and (ii) compare, via a comparator, a computed CRC parity of the CRC parity generator to CRC parity received from the CRC generator of the memory CRC engine to determine whether a data match occurs.

18. The computing system of claim 17, wherein during a read operation, the controller is configured to send a command for data to the memory from the host;
wherein the memory component is configured to retrieve the data from the memory array and send it to the CRC generator for generating the CRC parity and to the CRC check component of the controller CRC engine;
wherein the generated CRC parity is compared to the CRC parity of the data; and
wherein data is sent to the host when a data match occurs.

19. The computing system of claim 18, wherein when an error is detected at the memory interface during a CRC check of the read operation, the controller is configured to perform a CRC retry operation via the controller CRC engine; and
wherein the CRC retry operation counteracts the error when the error is a first tentative.

20. The computing system of claim 19, wherein when the error is not a first tentative, the data is retrieved via a redundant array of independent disk (RAID) recovery operation.

* * * * *